US012759657B2

(12) United States Patent
Nini

(10) Patent No.: US 12,759,657 B2
(45) Date of Patent: Oct. 13, 2026

(54) FORWARD AND BACKWARD SLIDABLE SADDLE ASSEMBLY FOR BIKE

(71) Applicant: Roberto Nini, Rome (IT)

(72) Inventor: Roberto Nini, Rome (IT)

( * ) Notice: Subject to any disclaimer, the term of this patent is extended or adjusted under 35 U.S.C. 154(b) by 106 days.

(21) Appl. No.: 18/822,900

(22) Filed: Sep. 3, 2024

(65) Prior Publication Data

US 2026/0001605 A1 Jan. 1, 2026

(30) Foreign Application Priority Data

Jul. 1, 2024 (TW) ................................ 113207006

(51) Int. Cl.
*B62J 1/08* (2006.01)
*B62J 1/12* (2006.01)

(52) U.S. Cl.
CPC .. *B62J 1/08* (2013.01); *B62J 1/12* (2013.01)

(58) Field of Classification Search
CPC ......... B62J 1/00; B62J 1/08; B62J 1/10; B62J 1/12; B60N 2002/0216
USPC ........................................ 297/215.14, 215.13
See application file for complete search history.

(56) References Cited

U.S. PATENT DOCUMENTS 3,891,333 A * 6/1975 Corderac'k ................ B62J 1/08 297/215.15
4,563,038 A * 1/1986 Hirose ....................... B62J 1/14 297/215.11
4,772,069 A * 9/1988 Szymski .................... B62J 1/08 297/214
5,383,706 A * 1/1995 Chen .......................... B62J 1/08 297/215.15
7,621,595 B1 * 11/2009 Chen .......................... B62J 1/08 297/215.14
9,573,642 B2 * 2/2017 Liao ........................... B62J 1/02
9,783,254 B2 * 10/2017 Li .............................. B62J 1/08

* cited by examiner

*Primary Examiner* — Milton Nelson, Jr.
(74) *Attorney, Agent, or Firm* — Rosenberg, Klein & Lee

(57) ABSTRACT

A forward and backward slidable saddle assembly includes a bottom board adapted to be mounted on a carrier of a bike; a slidable plate slidably mounted on the bottom board, formed with a pair of parallel channels spaced from each other by a distance in a front-rear extension direction; a securing assembly including a plurality of screw rods and a plurality of fixing pins; and a saddle body mounted on the slidable plate. When the saddle body is moved in the front-rear extension direction, the slidable plate is constrained by the securing assembly from detaching from the bottom board in an upward/downward direction while allowing the pair of parallel channels of the slidable plate to move relative to the plurality of fixing pins in the front-rear extension direction to have the slidable plate together with the saddle body moving relative to the bottom board in the front-rear extension direction.

7 Claims, 5 Drawing Sheets

FORWARD AND BACKWARD SLIDABLE SADDLE ASSEMBLY FOR BIKE

BACKGROUND OF THE INVENTION

1. Field of the Invention

The present invention relates to a saddle assembly, and more particularly to a slidable saddle assembly featuring forward and backward position adjustability.

2. The Related Arts

Designs of seat cushions or saddles for various carriers that function for users to ride and sit or transporting objects are mostly of a fixed structure arrangement. In such structures of the fixed seat cushions, it only needs to fix a seat cushion to a vehicle frame component (such as a vertical tube) by means of fasteners.

To suit the personal needs of various users in riding and sitting, such as to suit different body shapes, riding purposes, variations, or to increase comfortability of riding, manufacturers have proposed products of seat cushion capable of adjusting the position thereof. For a carrier that is structured for carrying and transporting objects, it also needs a product of seat cushion capable of position adjustment.

However, opposite to a relatively simple structure of the fixed seat cushion, a design of a position adjustable structure of carrier seat cushion must take into consideration whether the seat cushion satisfies requirements with respect to easy operation, safe structure, robust configuration, and durability.

SUMMARY OF THE INVENTION

Thus, an objective of the present invention is to provide a saddle assembly with forward/backward position adjustability, which suit the needs of different users or the needs for carrying and transporting objects.

To achieve the aforementioned objective, the present invention provides a forward and backward slidable saddle assembly includes a bottom board adapted to be mounted on a carrier of a bike; a slidable plate slidably mounted on the bottom board, formed with a pair of parallel channels spaced from each other by a distance in a front-rear extension direction; a securing assembly including a plurality of screw rods and a plurality of fixing pins respectively seated in the parallel channels and fastenable to top free ends of the plurality of screw rods; and a saddle body mounted on the slidable plate. When the saddle body is moved by a user in the front-rear extension direction, the slidable plate is constrained by the securing assembly from detaching from the bottom board in an upward/downward direction while allowing the pair of parallel channels of the slidable plate to move relative to the plurality of fixing pins in the front-rear extension direction to have the slidable plate together with the saddle body moving relative to the bottom board in the front-rear extension direction.

In efficacy, the forward and backward slidable saddle assembly provided in the present invention completely satisfies the requirements for easy operation, safe structure, robust configuration, and durability. The present invention can be widely applied to and mounted on an electrically-assisted bicycle, an electrically-assisted cargo-carrying bicycle, an electrically-assisted carrier, an electrical motorcycle, a cargo-carrying bicycle, a bicycle, or an exercise bike.

The technical solution adopted in the present invention will be further described with reference to the embodiments provided below and the attached drawings.

DETAILED DESCRIPTION OF THE PREFERRED EMBODIMENTS

Figure 1:
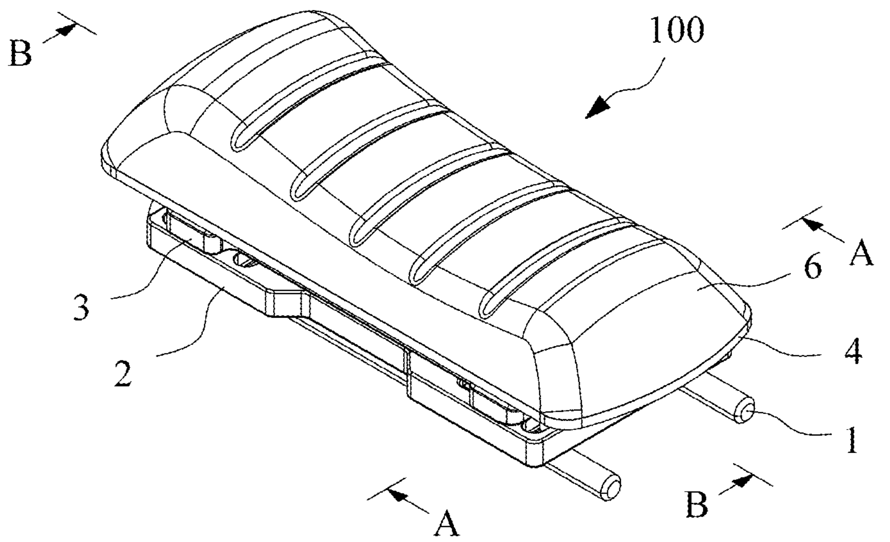
FIG. 1 is a perspective view showing a preferred embodiment of the present invention.
Figure 2:
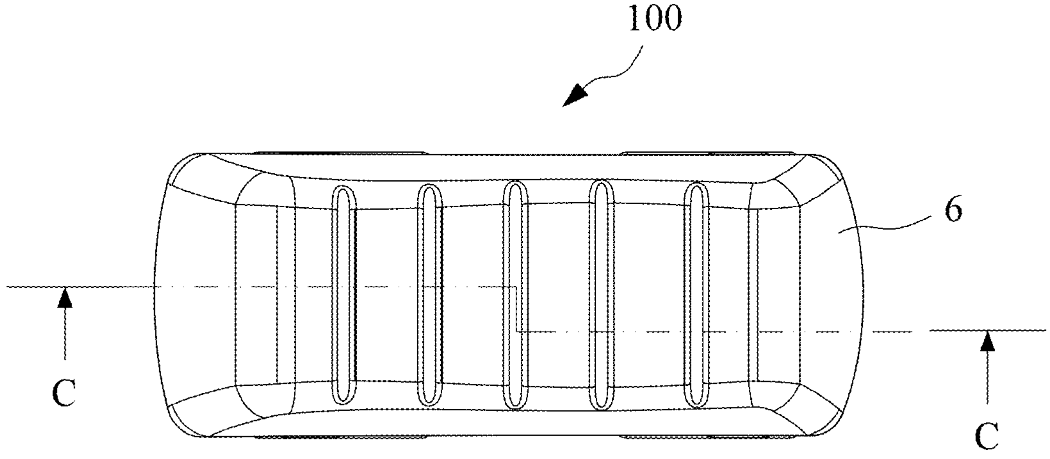
FIG. 2 is a top plan view showing the embodiment of FIG. 1.
Figure 3:
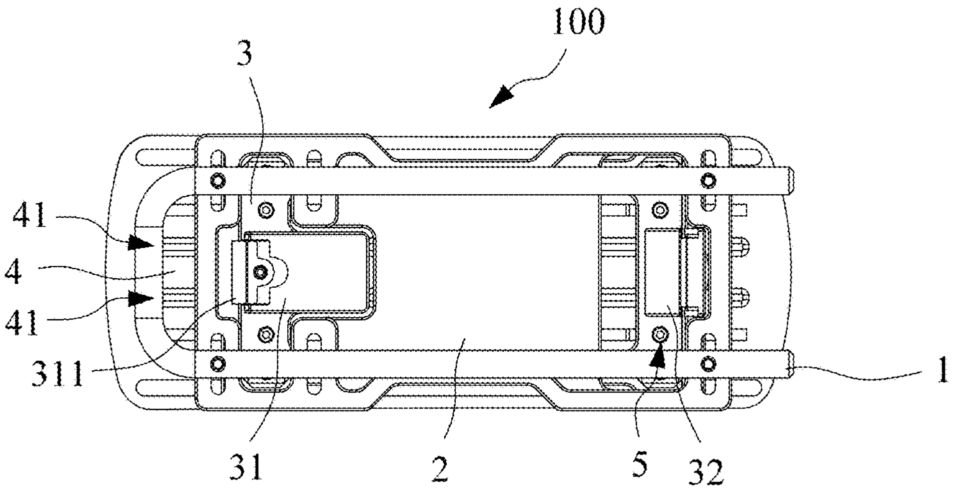
FIG. 3 is a bottom view showing the embodiment of FIG. 1.
Figure 4:
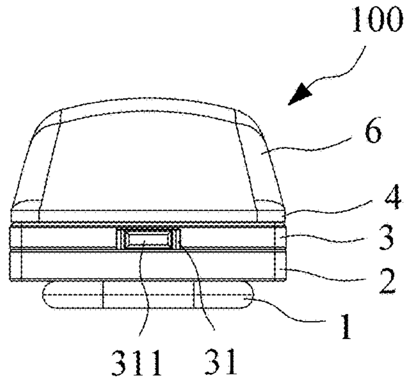
FIG. 4 is a left side elevational view showing the embodiment of FIG. 1.
Figure 5:
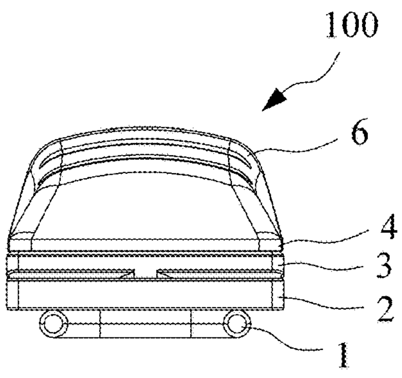
FIG. 5 is a right side elevational view showing the embodiment of FIG. 1.

As shown in FIGS. 1-5, the present invention provides, in one embodiment, a forward and backward slidable saddle assembly 100, which is applicable to mounting on a carrier 1 of a bike. The bike can be one of an electrically-assisted bicycle, an electrically-assisted cargo-carrying bicycle, an electrically-assisted carrier, an electrical motorcycle, a cargo-carrying bicycle, a bicycle, and an exercise bike. The carrier 1 can be a carrier of any configuration for the aforementioned bikes. For example, the carrier 1 may include a carrier made up of bars, braces, platforms, or supporting frames, and the carrier 1 may include a carrier plate 2 fixed thereto in advance.

The slidable saddle assembly 100 according to the present invention mainly comprises a bottom board 3, a slidable plate 4, a securing assembly 5, and a saddle body 6. The slidable saddle assembly 100 of the present invention is mounted by means of the bottom board 3 to the carrier plate 2, so as to fix the slidable saddle assembly 100 to the carrier 1 of the bike.

Figure 6:
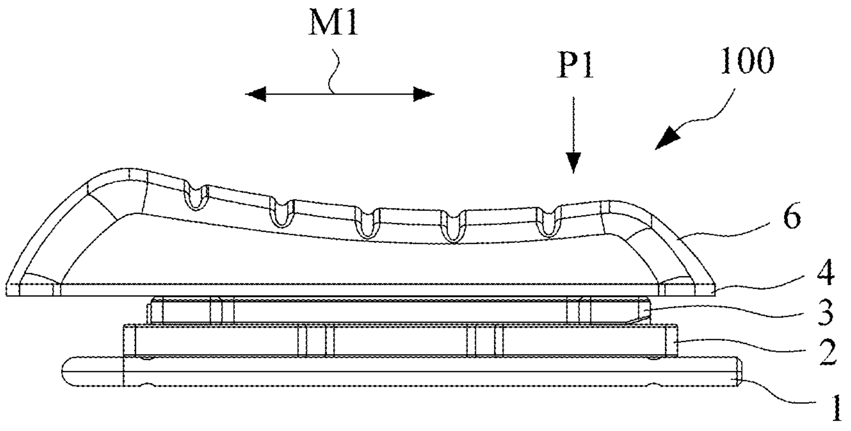
FIG. 6 is a side elevational view showing a saddle body of the embodiment of FIG. 1 at a first position.
Figure 7:
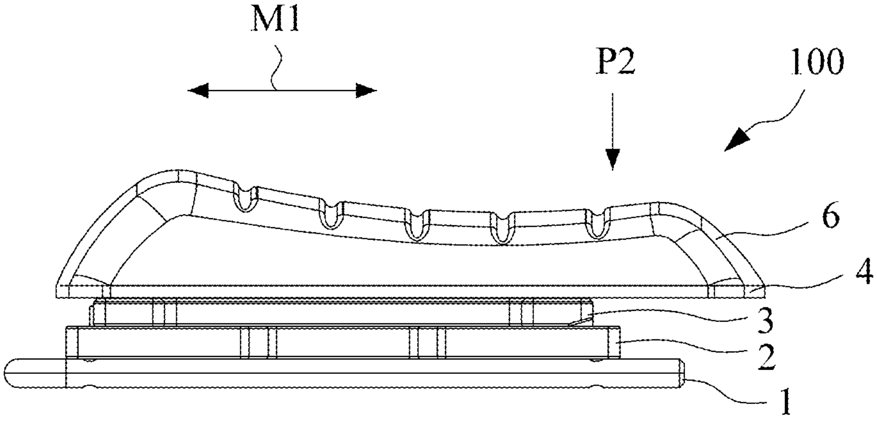
FIG. 7 is a side elevational view showing the saddle body of the embodiment of FIG. 1 at a second position.

As being operated by a user, the saddle body 6 is movable, together with the slidable plate 4, relative to the bottom board 3 in a front-rear extension direction M1 (which is defined as a direction in which the bike travels). As shown in FIGS. 6 and 7, FIG. 6 provides a side elevational view showing the saddle body 6 of the embodiment of FIG. 1 at a first position P1 relative to the bottom board 3, and FIG. 7 provides a side elevational view showing the saddle body 6 of the embodiment of FIG. 1 at a second position P2 relative to the bottom board 3.

Figure 8:
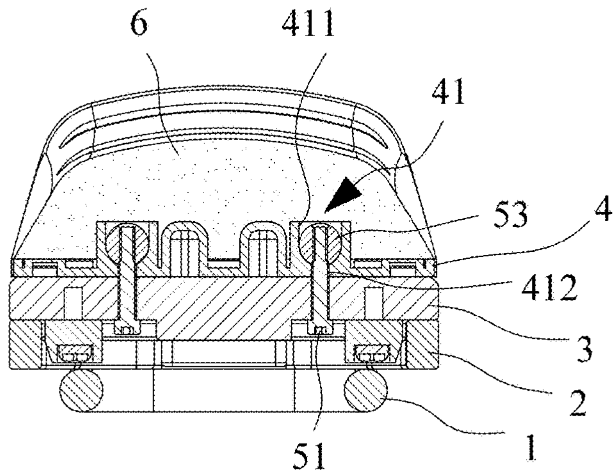
FIG. 8 is a cross-sectional view taken along line A-A of FIG. 1.
Figure 9:
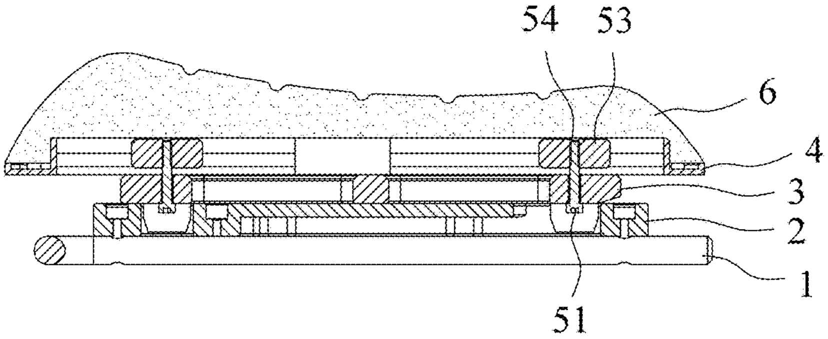
FIG. 9 is a cross-sectional view taken along line B-B of FIG. 1.
Figure 10:
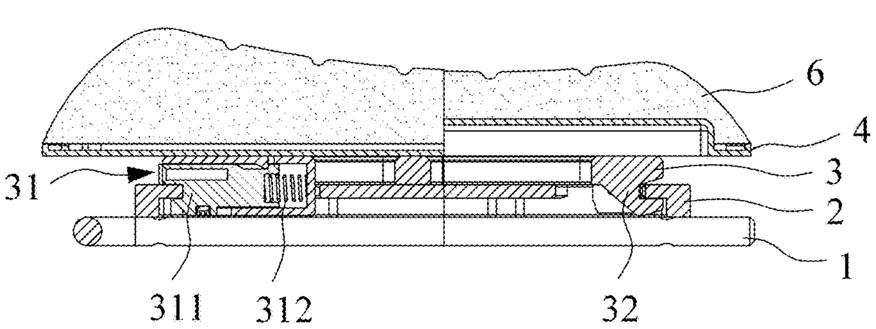
FIG. 10 is a cross-sectional view taken along line C-C of FIG. 2.
Figure 11:
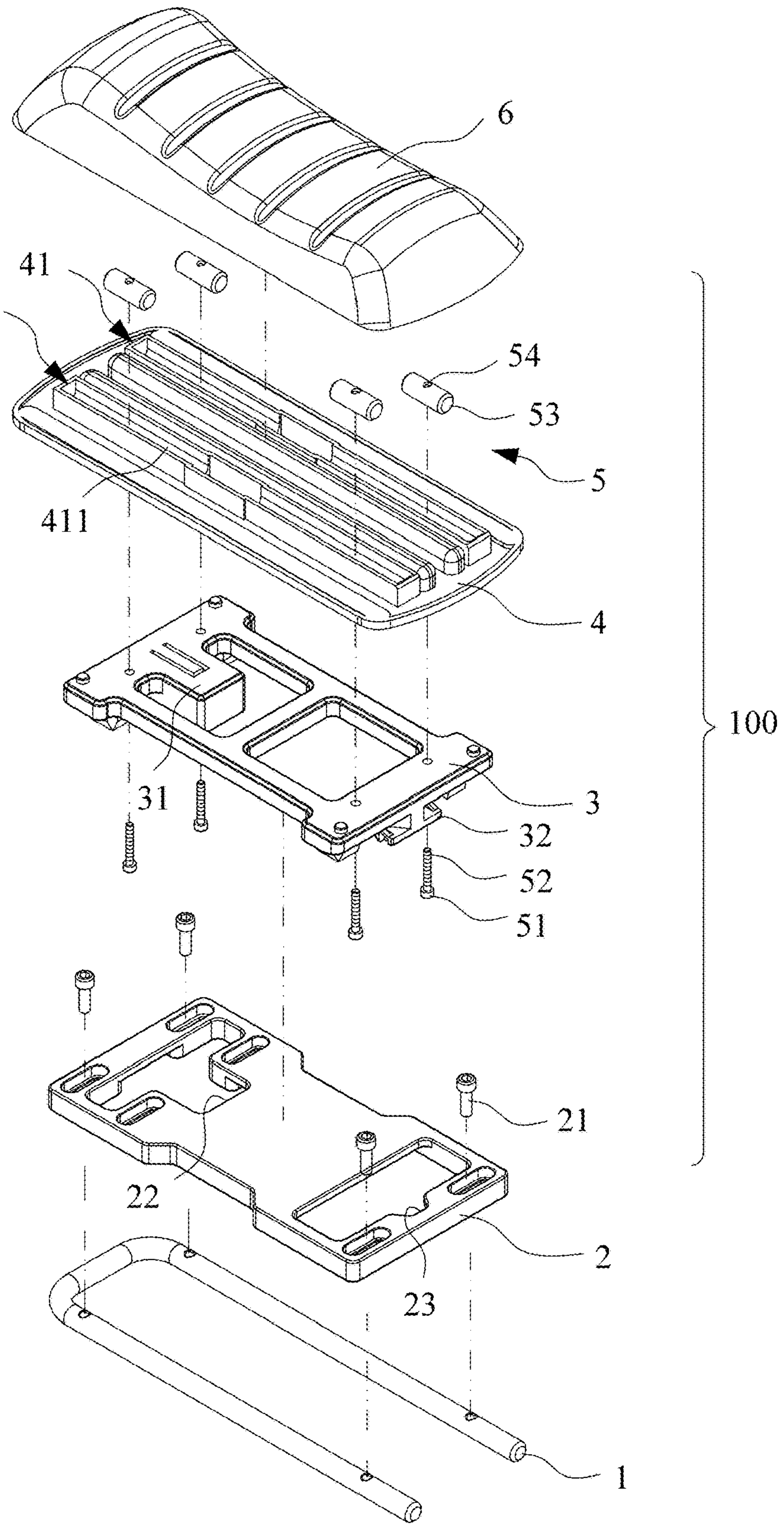
FIG. 11 is an exploded view showing components of the present invention detached from each other.

Referring jointly to FIGS. 8-11, FIG. 8 provides a cross-sectional view taken along line A-A of FIG. 1; FIG. 9 provides a cross-sectional view taken along line B-B of FIG. 1; and FIG. 10 provides a cross-sectional view taken along line C-C of FIG. 2. FIG. 11 provides an exploded view showing components of the present invention detached from each other.

The carrier plate 2 is fixed, using known fastening elements 21 (such as bolts or buckling members), on the carrier 1. The bottom board 3 is securely mounted, through buckling engagement by means of locking mechanisms 31, 32, to counterpart buckling portions 22, 23 of the carrier plate 2.

The slidable plate 4 is combined, in a slidable manner by means of the securing assembly 5, with the bottom board 3. The slidable plate 4 is formed with a pair of parallel channels 41, and the two parallel channels 41 are parallel to each other and spaced from each other by a distance, and are formed in the slidable plate 4 to extend in the front-rear extension direction M1. Each of the channels 41 comprises a top arc surface 411 and an opening slit 412 communicating between the top arc surface 411 and a bottom surface of the slidable plate 4 (as shown in FIG. 8). The saddle body 6 is fixed on the slidable plate 4.

The securing assembly 5 may comprise a plurality of screw rods 51 extending, in a direction from a lower side to an upper side, through apertures that are pre-formed in the bottom board 3 and the opening slits 412 of the pair of parallel channels 41 of the slidable plate 4 to have top free ends 52 of the screw rods 51 respectively projecting out of the top arc surfaces 411 of the parallel channels 41 by a predetermined height. A plurality of fixing pins 53 are respectively set in the pair of parallel channels 41, corresponding to the plurality of screw rods 51.

In an embodiment of the present invention, for the plurality of fixing pins 53, each fixing pin 53 is a cylindrical fixing pin, which is seated in the respective parallel channel 41 with a longitudinal direction thereof set in the front-rear extension direction M1, meaning each of the fixing pins 53 has an arc or cylindrical surface that is seated on the top arc surface 411 of the respective one of the parallel channels 41. Each cylindrical fixing pin 53 is formed with a threaded hole 54 extending in a vertical direction.

To assemble, the screw rods 51 are arranged to respectively penetrate, in a direction from a lower side toward an upper side, through the pre-formed apertures of the bottom board 3 and the opening slits 412 of the pair of parallel channels 41 of the slidable plate 4, and have the top free ends 52 thereof respectively screwed into the threaded holes 54 of the plurality of fixing pins 53 corresponding thereto.

When the saddle body 6 is pushed by a user to move in the front-rear extension direction M1, the slidable plate 4 is constrained by the fixing pins 53 from detaching from the bottom board 3 in either an upward direction or a downward direction, while allowing the pair of parallel channels 41 to move relative to the fixing pins 53 in the front-rear extension direction M1, so as to have the slidable plate 4 together with the saddle body 6 moving in the front-rear extension direction M1 relative to the bottom board 3, the carrier plate 2, and the carrier 1 to fulfill movement for position adjustment.

When the saddle body 6 is operated to slide or move to a desired location, screwing of the screw rods 51 to the fixing pins 53 can be made tightened to securely hold the saddle body 6 and the slidable plate 4 at the so-adjusted position without undesired movement.

Preferably, the locking mechanism 31 may comprise an operable button 311 and an elastic element 312 (as shown in FIG. 10). The operable button 311 is held in buckling engagement with the counterpart buckling portion 22 of the carrier plate 2 by means of the spring force provided from the elastic element 312, so that the slidable saddle assembly 100 according to the present invention is securely mounted on the carrier plate 2. A user, when attempting to detach the slidable saddle assembly 100 of the present invention from the carrier plate 2, only needs to press the operable button 311 to have the operable button 311 disengaging from the counterpart buckling portion 22 of the carrier plate 2.

For actual production, it is feasible to omit the bottom board 3 or to modify the structures of the bottom board 3 and the carrier plate 2 to have the two integrated together in order to simplify the constituent components but still be capable of mounting the slidable plate 4 to the carrier 1.

The embodiments provided above are illustrative structural arrangements provided for describing the present invention and are not intended to limit the present invention. Those skilled in the art may contemplate modifications and variations of the above-described embodiments within the structural arrangements and spirit of the present invention, and such variations are considered falling in the spirit of the present invention and the claims defined in the following. Thus, the scope of protection of the present invention is solely defined by the appended claims.

What is claimed is:

1. A forward and backward slidable saddle assembly (100) for a bike, comprising:
- a bottom board (3) adapted to be mounted on a carrier (1) of the bike;
- a slidable plate (4) slidably mounted on the bottom board (3), formed with a pair of parallel channels (41) spaced from each other by a distance, the pair of parallel channels (41) extending in a front-rear extension direction (M1);
- a securing assembly (5), including:
  - a plurality of screw rods (51), which extends, in a direction from a lower side toward an upper side, through the pair of parallel channels (41) of the slidable plate (4) to have top free ends (52) of the plurality of screw rods (51) projecting out for a height; and
  - a plurality of fixing pins (53) respectively seated in the parallel channels (41) and fastenable to the top free ends (52) of the plurality of screw rods (51); and
- a saddle body (6) mounted on the slidable plate (4);
- wherein when the saddle body (6) is moved by a user in the front-rear extension direction (M1), the slidable plate (4) is constrained by the securing assembly (5) from detaching from the bottom board (3) in an upward/downward direction while allowing the pair of parallel channels (41) of the slidable plate (4) to move relative to the plurality of fixing pins (53) in the front-rear extension direction (M1) to have the slidable plate (4) together with the saddle body (6) moving relative to the bottom board (3) in the front-rear extension direction (M1).

2. The forward and backward slidable saddle assembly according to claim 1, wherein each channel (41) of the pair of parallel channels (41) is formed with a top arc surface (411) and an opening slit (412) communicating between the top arc surface (411) and a bottom surface of the slidable plate (4).

3. The forward and backward slidable saddle assembly according to claim 2, wherein:
- each of the plurality of fixing pins (53) is a cylindrical fixing pin with a cylindrical surface, which is seated on the top arc surface (411) of a respective one of the parallel channels (41) in a manner of being slidable in a longitudinal direction of the fixing pin (53), a vertical threaded hole (54) being formed in the cylindrical surface of each of the cylindrical fixing pins (53); and the plurality of screw rods (51) penetrate through pre-formed apertures of the bottom board (3) and the opening slits (412) of the pair of parallel channels (41) to respectively screw into and fasten to the vertical threaded holes (54) of the plurality of fixing pins (53).

4. The forward and backward slidable saddle assembly according to claim 1, wherein the bike is one of an electrically-assisted bicycle, an electrically-assisted cargo-carrying bicycle, an electrically-assisted carrier, an electrical motorcycle, a cargo-carrying bicycle, a bicycle, and an exercise bike.

5. The forward and backward slidable saddle assembly according to claim 1, further comprising a carrier plate (2), the bottom board (3) being mounted by means of the carrier plate (2) to the carrier (1) of the bike.

6. The forward and backward slidable saddle assembly according to claim 5, wherein the bottom board (3) further comprises at least one locking mechanism (31, 32), and the bottom board (3) is securely fastened by the at least one locking mechanism (31, 32) to a counterpart buckling portion (22, 23) of the carrier plate (2).

7. The forward and backward slidable saddle assembly according to claim 6, wherein the locking mechanism (31, 32) comprises an operable button (311) and an elastic element (312), the operable button (311) being set in buckling engagement with the counterpart buckling portion (22, 23) of the carrier plate (2) by a spring force of the elastic element (312).

* * * * *